United States Patent Office 3,468,677
Patented Sept. 23, 1969

3,468,677
HARD WAX AND POLISH COMPOSITIONS CONTAINING THE SAME
Ernst Weingaertner, Hamburg, Dieter Berg, Buxtehude, and Karl Ernst Christian Streckebach, Hamburg, Germany, assignors to Deutsche Erdol-Aktiengesellschaft, Hamburg, Germany, a corporation of Germany
No Drawing. Filed Sept. 29, 1965, Ser. No. 491,394
Claims priority, application Germany, Oct. 7, 1964, D 45,577
Int. Cl. C09g 1/08; C08h 9/10
U.S. Cl. 106—10                                7 Claims

ABSTRACT OF THE DISCLOSURE

Hard waxes for use in polishing materials such as paste polishes, wax emulsions and the like which hard waxes comprise the distillation residues of crude alcohols obtained from an Alfol synthesis, i.e., by reaction of trialkyl aluminum with ethylene followed by oxidation of the aluminum alkyl growth products and hydrolysis of the oxidation products. In the instances where the alcohols have M-value of less than 20 (M-value designating that number of mols of ethylene absorbed per mol of Al-C) the alcohols can be employed in admixture with a polyolefin. Alcohols having an M-value of less than 10 are etherified or esterified prior to use and can be used in this form or again in admixture with a polyolefin. Polishing materials, i.e., waxes or liquids containing such hard waxes are characterized by their improved properties for instance gloss produced when they are used.

---

This invention relates to the production of hard waxes. More particularly, this invention relates to the production of hard waxes suitable for use in a great variety of compositions, such as paste polishes, floor wax emulsions, and the like.

Polishing materials, such as floor polishing waxes, generally consist of a volatile solvent, a microwax, a hard paraffin and a so-called hard wax. The hard wax is codeterminative of the properties possessed by the polish. The hard wax consists generally of a mixture of oxygen containing components, i.e., of esters, fatty acids and saponified fats. The present invention relates to a novel type of hard wax, suitable for use in floor polish compositions, wax emulsions, paste wax compounds, and the like.

It is an object of the present invention to provide a process for the preparation of a novel hard wax.

It is another object of this invention to provide a novel type of wax suitable for use in floor polish compositions, wax emulsions, paste wax compounds, and the like.

Other objects will become apparent during the following discussion.

According to a known polymerization process, primary straight-chained higher alcohols are produced by reaction of ethylene and organic aluminum compounds. Starting from trialkylaluminum, aluminum alkyls of greater chain length are produced in a so-called growth reaction with ethylene. The aluminum alkyls of increased chain lengths are oxidized to form alkoxyaluminum compounds and then hydrolyzed. Mixtures of alcohols of different chain lengths are thus obtained of varying percentage composition. The latter alcohol synthesis will be referred to hereinafter as an "Alfol alcohol synthesis" ("Alfol" is a registered trademark). The chain length of the alcohols is determined substantially by what is known as the M-value of the above-mentioned growth reaction. The term "M-value" designates the number of mols of ethylene absorbed per mol of Al-C (aluminum-carbon bond). In the further processing of the crude alcohol mixture, which is performed by distillation up to incipient decomposition, i.e., at temperatures up to 230–260° C. and at reduced pressure, as, for instance, 15 mm. Hg, there is produced a concentrate comprising substantially alcohols of increased chain length, as well as of other compounds, mostly paraffins of high molecular weight.

Now, in accordance with this invention, it has been found that the concentrate obtained by distilling up to incipient decomposition, i.e., at temperatures up to 230–260° C. and at reduced pressure, the alcohol mixture obtained as the reaction product of an "Alfol" alcohol synthesis can be used advantageously as hard waxes. Still in accordance with this invention, it has been found that the aforesaid alcohol mixture can be employed as the hard wax component for such products as, for example, floor polishing waxes, both paste and emulsion, shoe-care products, automobile and furniture waxes, laminating waxes and carbon-paper waxes.

According to one aspect of this invention, the above-described distillation concentrates can be used directly as a hard wax if they have been prepared by a growth reaction which has been carried out with an M-value greater than 25.

Another aspect of this invention comprises the utility of the alcohol mixture where the growth reaction involved in the alcohol synthesis described above is interrupted or discontinued before an M-value of 25 has been reached (M-value between 25 and 20). According to the invention the addition of a polyolefin to the alcohol concentrate results in the production of a highly advantageous hard wax.

Of course, polyolefins can also be added to distillation concentrates originating in growth reactions having M-values greater than 25, but this is not necessary because the properties of the concentrates obtained from syntheses conducted with M-value greater than 25 satisfies all of the requirements which a hard wax must meet.

The use of the crude alcohol concentrate as a hard wax with or without the addition of polyolefins is not possible per se where the M-value of the synthesis is even lower than 20–25 and in fact falls between 20 and 10. In that case, the normal alcohols must be separated from the concentrate, which can be done in the conventional manner, as for example by recrystallization from hexane. According to another aspect of the invention, the normal alcohols thus separated are also suitable as hard waxes, the addition of polyolefins being necessary when the growth reaction has been conducted with an M-value between 10 and 15, while their addition in the case of growth reactions carried out with M-values between 15 and 20 is possible, but not necessary.

It is also possible in accordance with the invention to use as hard waxes the normal alcohols separated from those concentrates which originated from a growth reaction carried out with an M-value greater than 20. That is, the recrystallization removes the by-products of the Alfol alcohol synthesis which adversely affect the properties of the normal alcohols.

In the case of still lower M-values (less than 10), the normal alcohols isolated from the concentrate are required to be etherified or esterified.

The etherification is carried out in the conventional manner. The alcohol mixture can be divided up into its individual components, or the mixture can be subjected directly to etherification. It is essential for the usuability of these ethers as hard waxes that the ether molecule contain at least 30 carbon atoms. Purified ethers, such as ethers recrystallized from n-hexane, are preferred to crude ethers for use in the production of hard waxes. In any case, polyolefins have to be added to the resulting ethers to produce suitable hard wax materials.

Dicarboxylic acids are to be used primarily for the esterfication of the normal alcohols separated from the concentrate, and preferably dicarboxylic acids containing 4–10 carbon atoms in the molecule. If monocarboxylic acids are used as the acid component, it is necessary to use acids having chains containing at least 14 carbon atoms. The esters can be used as hard waxes if they contain at least 30 carbon atoms in the molecule. It is particularly advantageous to use as acid component for the esters those acids which can be obtained by oxidation of the separated normal alcohols. Acids having defined carbon numbers as well as mixtures of acids can be used as acid component for the esterfication.

The acids obtained by oxidation of the purified acohols can, according to a further aspect of the invention, also be esterified with alcohols which do not originate from the alcohol synthesis described above to form esters suitable for use in the production of hard waxes. A preferred instance of such an alcohol is 1,3-butylene glycol.

The addition of polyolefins to the latter ester product is necessary in order to produce a satisfactory hard wax product.

The polyolefins which are usitable for use in the production of hard wax products include polyethylenes, polybutylenes and the like, and have a molecular weight between 2,000 and 10,000.

If, however, alcohols originating from the residue of an Alfol alcohol synthesis, i.e., a growth reaction having an M-value greater than 10 are esterfied, these esters as well as the corresponding ethers can be used directly as hard waxes without additives, both when the alcohols have been separated from the concentrate before the etherification or esterification, and when the concentrate has been directly etherified or esterified. It is possible, of course, to add polyolefin to these ethers and esters.

Typical paste waxes and emulsion wax preparations containing the hard wax in accordance with the invention have the following respective compositions:

| Paste wax: | Percent |
| --- | --- |
| Test benzine | 60–85 |
| Microwax | 0–5 |
| Paraffin | 0–37 |
| Hard wax | 3–40 |
| Emulsion wax: | |
| Hard wax | 7 |
| Paraffin | 3 |
| Emulsifier | 1.3 |
| Water | 88.7 |

Suitable emulsifying agents are trihydroxyalkylamines, resinous compounds and soaps.

The invention is illustrated by the following examples of certain preferred embodiments thereof, although it will be understood that the exampes are illustrative only and not intended to limit the scope of the invention unless otherwise specifically indicated.

Pastes were prepared from the materials set out in the following examples, in the quantity ratios stated. The concentrates used in these cases were obtained in all instances by distiling the fatty alcohol mixtures at temperatures of up to 250° C. and at a pressure of 15 mm. Hg. The properties of the pastes containing the waxes of the examples were compared with those of a standard commercial paste which contains as the hard wax component mainly the ester of a bivalent alcohol prepared from air with oxidized montan wax, plus free oxidized montan wax and a calcium soap thereof. This hard wax will be referred to hereinafter as montan hard wax (MHW). The gloss measurements were carried out under precisely comparable conditions using a glossmeter of standard cinstruction, and a method proposed by a technical association. The hardness measurements, that is, the measurements of the penetration value or index at 25° C. ($PI_{25}$) were made with a penetrameter of standard construction. The hard waxes were analyzed using the standard needle (18–061):2.0 g., 1 mm. diam., 72 mm. long; and a drop bar weighing 98.0 g. Because of the softness of the pastes, another arrangement had to be employed for the determinations of the hardness of the pastes and namely needle (18–0221):3.05 g., diam. 3 mm.; length 56 mm., drop bar 8.3 g. However, the remaining test specifications were observed (temp. 25° C., time of action 5 sec.). The determination of the softening point (EP) of the hard waxes was conducted according to DIN Standard 51556.

Example 1

A concentrate which had been obtained in a growth reaction having an M-value of 25 was made into a paste consisting of 6 wt. percent of the concentrate, 3 wt. percent of microwax;[1] 21 wt. percent of paraffin (EP=55.5° C., $PI_{25}$=15)[2] and 70 wt. percent test benzine (boiling range 140–190° C.).

A simultaneously prepared commercial paste contained 6 wt. percent of montan hard wax (MHW), 3 wt. percent of microwax, 21 wt. percent of paraffin (EP=55.5° C., $PI_{25}$=15) and 70 wt. percent of test benzine (boiling range 140–190° C.).

[1] The microwax consists of about 70% naphthenic hydrocarbons, 30% paraffinic hydrocarbons and traces of aromatic hydrocarbons.
[2] The paraffin was composed of about 80% of normal paraffins having a chain length of 20–34 carbon atoms and about 20% of naphthenic hydrocarbons. (The above designations apply equally to all of the examples.)

Unless otherwise stated, the commercial paste used for comparison purposes in all of the following examples has this composition; the values obtained in the measurements are set out between parentheses in each case.

The pastes prepared in accordance with this example had a gloss value of 22 (24.5), and the $PI_{25}$ of the paste amounted to 31 (23).

Example 2

A concentrate derived from a growth reaction having an M-value of 20 was mixed with a polyethylene having a molecular weight of about 6000, in a weight ratio of 66.6:33.3. The resulting hard wax had a softening point of about 91° C. and a $PI_{25}$ of 4. A paste was produced by combining 6 wt. percent of this hard wax with 3 wt. percent of microwax, 21 wt. percent paraffin (EP=55.5° C., $PI_{25}$=15) and 70 wt. percent of test benzine (boiling range 140.190° C.). This paste had a gloss value of 18 (21), and the PI of the paste amounted to 26 (23).

Example 3

A concentrate derived from a growth reaction having an M-value of 20 was mixed in a weight ratio of 66.6:33.3 with polyethylene having a molecular weight of about 3000. The resultant hard wax had a softening point of 88° C. and a $PI_{25}$ of 5. A paste was prepared from 6 wt. percent of this hard wax, 3 wt. percent of microwax, 21 wt. percent of paraffin (EP=55.5° C., $PI_{25}$=15) and 70 wt. percent test benzine. The gloss value observed for this paste was 21 (21), and its PI=50 (23).

Example 4

The n-alcohols contained in the concentrate produced from a growth reaction having an M-value of 15 were isolated by recrystallization from n-hexane, and mixed in a weight ratio of 80:20 with polyethylene having a molecular weight of about 6000. The resultant hard wax had a softening point of about 90° C. and a $PI_{25}$ of 2. A paste was prepared from 6 wt. percent of this hard wax, 3% microwax, 21% paraffin (EP=55.5° C.; $PI_{25}$=15) and 70% of testing benzine. The wax was found to have a gloss number of 19 (21) and a PI of 24 (23).

Example 5

The mixture of n-alcohols contained in the residue as obtained from a growth-reaction having an M-value of 4 was separated by recrystallization from n-hexane, and etherified. The crude ether obtained was recrystallized from n-hexane. The crystalline product was mixed with polyethylene (mol. wt. approx. 6000) in a weight ratio of 80:20. It had a softening point of 86.5° C. and a $PI_{25}$ of 2. A paste was prepared from 9 wt. percent of this hard wax, 3 wt. percent of microwax, 18 wt. percent of paraffin (EP=55.5° C.; $PI_{25}$=15) and 70 wt. percent of test benzine. The resulting paste had a gloss value of 29 (29) and a PI of 23 (23).

Example 6

The mixture of n-alcohols contained in the residue of a growth reaction having an M-value of 4 was separated by recrystallization from n-hexane, and etherified. The crude ether which was obtained was recrystallized out of n-hexane. The crystalline product was mixed with polyethylene (mol. wt. approx. 6000) in a weight ratio of 80:20. It had a softening point of 89.5° C. and a $PI_{25}$=2. A paste was prepared from 5 wt. percent of this hard wax, 20 wt. percent paraffin (EP=55.5° C.; $PI_{25}$=15) and 75 wt. percent of test benzine. A simultaneously produced paste contained 5 wt. percent of MHW, 20 wt. percent paraffin (EP=55.5° C.; $PI_{25}$=15) and 75 wt. percent of test benzine. In this extreme composition, the first mentioned paste (in accordance with the invention) demonstrated a gloss value of 24, and the second paste a gloss value of 22.5. The hardness values amounted to 55 and 22, respectively.

Example 7

The mixture of n-alcohols contained in the residue from a growth reaction having an M-value of 4 was separated by recrystallization from n-hexane. The n-$C_{24}$ alcohol was then separated by distillation from the other n-alcohols, and esterified with sebacic acid. The ester was mixed with polyethylene having a mol. wt. of about 6000 in an 80:20 weight ratio. The hard wax had an EP of 92° C., and a $PI_{25}$ of 1.5. 6 wt. percent of this hard wax was mixed into a paste with 3 wt. percent of microwax, 21 wt. percent of paraffin (EP=55.5° C., $PI_{25}$=15) and 70 wt. percent of test benzine. The paste had a gloss number of 20 (21) and a PI of 90–100 (23).

Example 8

The n-alcohol mixture contained in a residue derived from a growth reaction having an M-value of 4 was separated by recrystallization from n-hexane and esterified with succinic acid. The ester was then mixed with a polyethylene (mol. wt. approx. 6000) in a weight ratio of 80:20. The hard wax thus produced had a softening point of 88° C.; a $PI_{25}$ of 4. 7.5 wt. percent of this hard wax was mixed together to form a paste with 3 wt. percent of microwax, 19.5 wt. percent of paraffin (EP=55.5° C.; $PI_{25}$=15) and 70 wt. percent of test benzine. The paste had a gloss number of 27 (24.5) and a PI of 29 (23).

Example 9

The mixture of n-alcohols contained in the residue of a growth reaction having an M-value of 4 was separated by recrystallization from n-hexane, and esterified with succinic acid. The ester was thereafter mixed with a polyethylene (mol. wt. about 6000) in a weight ratio of 80:20. The hard wax had a softening point of 88° C. and a $PI_{25}$ of 4. 6 wt. percent of this hard wax was mixed to form a paste with 3 wt. percent microwax, 21 wt. percent paraffin (EP=60.5° C.; $PI_{25}$=9). The resulting paste had a gloss value of 31 (24.5) and a PI of 35 (23).

Example 10

The mixture of n-alcohols contained in the residue from a growth reaction having an M-value of 4 was separated by a recrystallization from n-hexane. A portion thereof was treated with a dehydrating fused alkali mixture, and esterified with the unoxidized remainder. The resulting ester was mixed in a weight ratio of 80:20 with polyethylene (mol. wt. approx. 6000). This hard wax had a softening point of 93° C., a $PI_{25}$ of 3.5. 6 wt. percent of this hard wax was mixed to form a paste with 3 wt. percent microwax, 21 wt. percent paraffin (EP=55.5° C., $$PI_{25}=15)$$

and 70 wt. percent test benzine. The paste had a gloss number of 33 (29) and a PI of 36 (23).

Example 11

The mixture of n-alcohols contained in the residue from a growth reaction having an M-value of 4 was separated by recrystallization from n-hexane, treated with a dehydrating fused alkali, and esterified with 1,3-butylene glycol. The ester thereby produced was mixed in a weight ratio of 80:20 with polyethylene (mol. wt. about 6000). This hard wax had a softening point of 96° C., and a $PI_{25}$ of 1.5. 6 wt. percent of the hard wax was mixed to form a paste with 3 wt. percent microwax, 21 wt. percent paraffin (EP=55.5° C.; $PI_{25}$=15) and 70 wt. percent test benzine. The paste thus formed had a gloss value of 34 (29) and a PI of 46 (23).

Example 12

The mixture of n-alcohols contained in the residue from a growth reaction having an M-value of 15 was separated by recrystallization from n-hexane and etherified. The crude ether which was thereby formed was mixed in a weight ratio of 80:20 with polyethylene (mol. wt. about 6000). The resultant hard wax had a softening point of 92° C., a $PI_{25}$ of 0.5, 6 wt. percent of this hard wax were admixed with 3 wt. percent microwax, 21 wt. percent paraffin (EP=55.5° C.; $PI_{25}$=15) and 70 wt. percent test benzine to produce a paste whose gloss number amounted to 26 (21) and having a penetration value of 22 (23).

Example 13

The mixture of n-alcohols contained in the residue from a growth reaction having an M-value of 15 was separated by recrystallization from n-hexane and esterified with succinic acid. The resultant ester was mixed in a weight ratio of 80:20 with polyethylene (mol. wt. about 6000). This hard wax had a softening point of 90° C. and a $PI_{25}$ of 1. 6 wt. percent of this hard wax and 3 wt. percent microwax, 21 wt. percent paraffin (EP=55.5° C.; $PI_{25}$=15) and 70 wt. percent of test benzine resulted in a paste having a gloss value of 20.5 (21) and a PI of 48 (23).

Example 14

The mixture of n-alcohols contained in the residue of a growth reaction having an M-value of 15 was separated by recrystallization from n-hexane and mixed in a weight-ratio of 80:20 with polyethylene (molecular weight about 6000). The hard wax thereby obtained had a softening point of 90° C. and a $PI_{25}$ of 2. 5 wt. percent of this hard wax plus 20 wt. percent paraffin (EP=55.5° C.; $PI_{25}$=15) and 75 wt. percent of test benzine were admixed to form a paste. A paste was simultaneously prepared containing 5 wt. percent of MHW, 20 wt. percent of paraffin $$(EP=55.5°$$

C.; $PI_{25}$=15) and 75 wt. percent of test benzine. In these extreme compositions, the first paste demonstrated a gloss value of 15.5, and the comparison paste a gloss value of 17.5; the penetration values amounted to 45 and 22, respectively.

Example 15

The mixture of n-alcohols contained in the residue of a growth reaction having an M-value of 4 was isolated by recrystallization from n-hexane and esterified with succinic acid. 13⅓ parts by weight of the hard wax thus obtained were stirred together with 26⅔ parts by weight of polyethylene (molecular weight about 6000), 30 parts by weight of each of 2 different microwaxes, 20 parts by weight of paraffin (EP=55.5° C.; $PI_{25}$=15) and 880 parts by weight of test benzine, to form a liquid floor polish.

A liquid floor wax prepared for comparative purposes consisted of 30 parts by weight of each of the same two microwaxes, 20 parts by weight of the same paraffin, 880 parts of the same test benzine and 40 parts by weight of a commercial hard wax for liquid floor polishes, consisting of a mixture of wax acids, soap and paraffin.

The first liquid floor polish had a gloss value of 17.5, and the second (comparative wax) a gloss value of 13.5.

After ten days of storage at room temperature, no separation of solvent or settling of wax could be detected in either of the two samples.

We claim:

1. Hard waxes yielding films of high gloss comprising a mixture of the distillation residue of crude alcohols having an M-value of between 20 and 25 obtained by reaction of an aluminum trialkyl with ethylene followed by oxidation of the resultant aluminum alkyl growth product, hydrolysis of the resultant oxidation product and distillation of the hydrolysis product at reduced pressure up to incipient decomposition wherein the M-value designates the number of mols of ethylene absorbed per mol of aluminum-carbon bond and at least one polyolefin selected from the group consisting of polyethylene, polypropylene and polybutylene having a molecular weight of from 2000 to 10,000 in a weight ratio of 1–4:1–2 of hard wax to polyolefin.

2. Hard waxes yielding films of high gloss comprising a mixture of esters of the normal alcohol fraction separated from the distillation residue of crude alcohols having an M-value of less than 10 obtained by reaction with an aluminum trialkyl with ethylene followed by oxidation of the resultant aluminum alkyl growth product, hydrolysis of the resultant oxidation product and distillation of the hydrolysis product at reduced pressure up to incipient decomposition wherein the M-value designates the number of mols of ethylene absorbed per mol of aluminum-carbon bond and at least one polyolefin selected from the group consisting of polyethylene, polypropylene, polybutylene having a molecular weight of from 2000 to 10,000 in a weight ratio of 1–4:1–2 of said hard wax to polyolefin.

3. Hard waxes yielding films of high gloss comprising a mixture of ethers having at least 30 carbon atoms of the normal alcohol fraction separated from the distillation residue of crude alcohols having an M-value less than 10 obtained by reaction with an aluminum trialkyl with ethylene followed by oxidation of the resultant aluminum alkyl growth product, hydrolysis of the resultant oxidation product and distillation of the hydrolysis product at reduced pressure up to incipient decomposition wherein the M-value designates the number of mols of ethylene absorbed per mol of aluminum-carbon bond in admixture with a polyolefin selected from the group consisting of polyethylene, polypropylene, polybutylene having a molecular weight of from 2000 to 10,000 in a weight ratio of 1–4:1–2 of hard wax polyolefin.

4. Hard waxes yielding films of high gloss comprising a mixture of an ester of the distillation residue of crude alcohols having an M-value less than 7 obtained by reaction of aluminum trialkyl with ethylene followed by oxidation of the resultant aluminum alkyl growth products, hydrolysis of the oxidation products and distillation of the hydrolysis product at reduced pressures up to incipient decomposition wherein the M-value designates the number of mols of ethylene absorbed per mol of aluminum-carbon bond with monovalent straight chained alcohols having at least 14 carbon atoms, with at least one polyolefin selected from the group consisting of polyethylene, polypropylene, polybutylene having a molecular weight of from 2000 to 10,000 in a weight-ratio of 1–4:1–2 of hard wax:polyolefin.

5. A paste type polish yielding films of high gloss consisting essentially of:
3–40% of a hard wax according to claim 1,
60–85% of test benzene,
0–5% of a microwax consisting of 70% naphthenic hydrocarbons and 30% paraffinic hydrocarbons, and,
0–3% of a hard paraffin consisting of 80% normal paraffins having a chain length of 20–34 carbons and 20% naphthenic paraffins.

6. An emulsion type floor wax consisting essentially of:
7% of a hard wax composition according to claim 1,
3% hard paraffin consisting of 80% normal paraffins having a chain length of 20–34 carbons and 20% naphthenic paraffins,
1.3% of an emulsifying agent, and
88.7% water.

7. A paste type floor wax consisting essentially of:
40 parts by weight of a hard wax according to claim 1,
60 parts by weight of a microwax consisting of 70% naphthenic hydrocarbons and 30% paraffinic hydrocarbons,
20 parts by weight of paraffin consisting of 80% normal paraffins having a chain length of 20–34 carbons and 20% naphthenic paraffins and,
880 parts by weight of test benzene.

References Cited
UNITED STATES PATENTS

| | | | |
|---|---|---|---|
| 2,993,800 | 7/1961 | Pickell | 106—271 |
| 3,074,799 | 1/1963 | Kendall | 106—10 |
| 3,088,928 | 5/1963 | Berres et al. | 260—29.2 |
| 3,143,431 | 8/1964 | Kaupp et al. | 106—8 |

JULIUS FROME, Primary Examiner

JOAN B. EVANS, Assistant Examiner

U.S. Cl. X.R.

106—11, 270, 271; 260—28.5

UNITED STATES PATENT OFFICE
CERTIFICATE OF CORRECTION

Patent No. 3,468,677 September 23, 1969

Ernst Weingaertner et al.

It is certified that error appears in the above identified patent and that said Letters Patent are hereby corrected as shown below:

Column 5, line 72, "dehydrating" should read -- dehydrogenating --. Column 6, line 12, "dehydrating" should read -- dehydrogenating --; line 30, "0.5," should read -- 0.5. --. Column 7, line 9, before "wax" insert -- to --.

Signed and sealed this 26th day of May 1970.

(SEAL)
Attest:

Edward M. Fletcher, Jr.
Attesting Officer

WILLIAM E. SCHUYLER, JR.
Commissioner of Patents